Nov. 29, 1938.  J. J. TREFZ ET AL  2,138,412
PRESSURE CONTROL DEVICE
Filed April 14, 1937  2 Sheets-Sheet 1
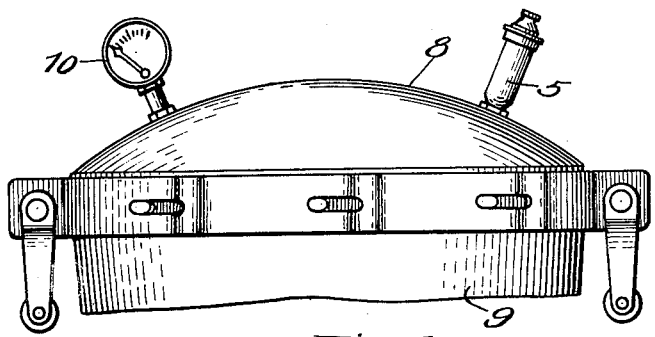
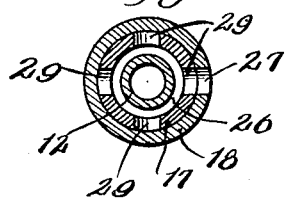
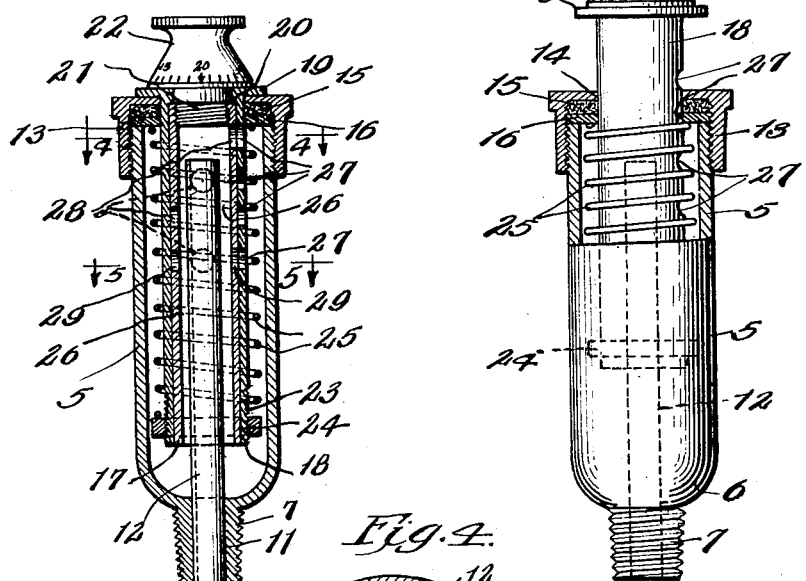
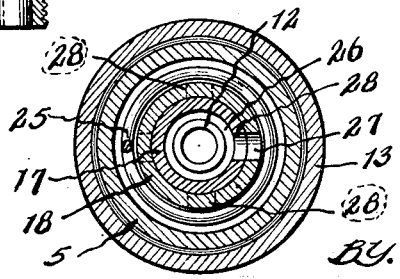
Inventors
JULIUS J. TREFZ &
OTTO KASPAR Nov. 29, 1938.   J. J. TREFZ ET AL   2,138,412
PRESSURE CONTROL DEVICE
Filed April 14, 1937   2 Sheets-Sheet 2
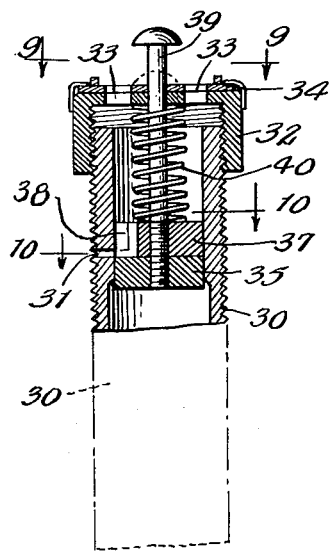
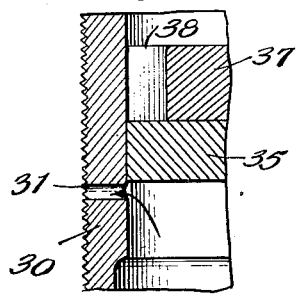
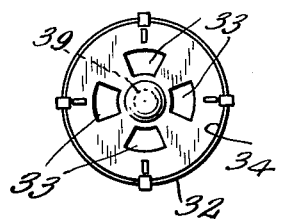
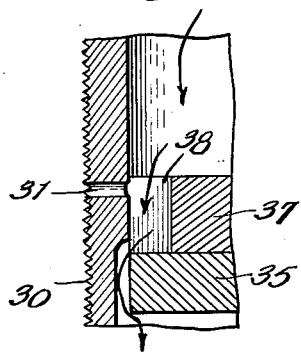
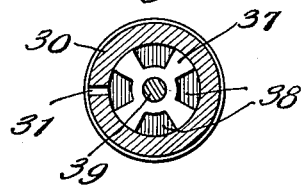
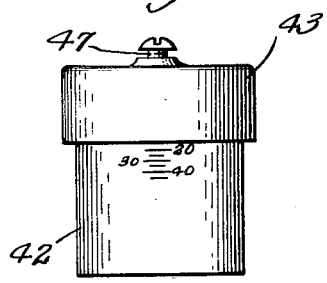
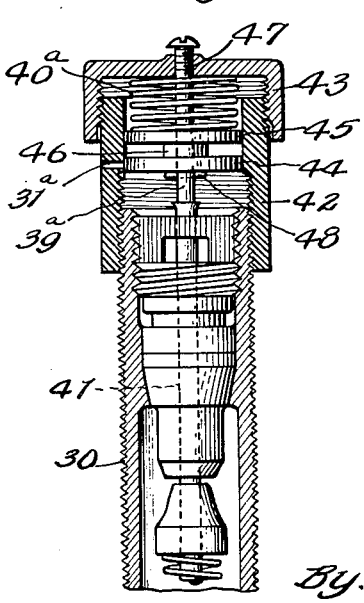
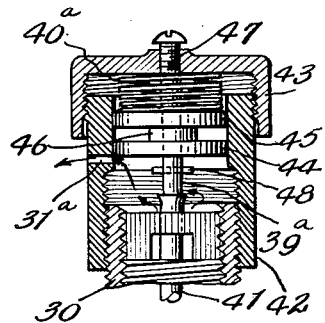
Inventors
JULIUS J. TREFZ
& OTTO KASPAR.

Patented Nov. 29, 1938

2,138,412

UNITED STATES PATENT OFFICE 2,138,412

PRESSURE CONTROL DEVICE

Julius J. Trefz, Evanston, and Otto Kaspar, Chicago, Ill.

Application April 14, 1937, Serial No. 136,782

4 Claims. (Cl. 137—53)

The present invention relates to means for controlling pressure in devices where it is desired to maintain a predetermined selected degree of pressure. More specifically the invention pertains to a valve which, either prior to or after creating the pressure in a closed chamber, may be readily and accurately adjusted to the pressure it is desired to maintain within the chamber. The present device is designed so that it is adapted for a variety of uses such for example as in connection with a pressure cooker, an automobile tire, etc.

The structure is made in a manner that permits an even pressure being maintained under normal conditions, and in case such pressure is increased above the amount to which the device has been "set" the surplus pressure will be allowed to escape without lowering the pressure in the chamber to a point too far below that which is desired. Certain types of "pop-off" or "blow-off" valves have heretofore been provided but these have the inherent objection that whenever they are forced open too much fluid escapes and the pressure within the chamber is thus reduced to such a low point as to be undesirable. This is especially true in pressure cookers where the cooking process will be retarded until the required pressure has been built up again. Furthermore, these types of blow-off valves are usually not capable of adjustment by the user because they are set at the factory manufacturing them so that they will open at a single fixed pressure. Such valves are usually provided merely for the purpose of safety. Hence the user is limited to only one definite amount of pressure in a pressure cooker for all kinds of comestibles regardless of their physical characteristics; whereas it is very desirable to use different pressures in preparing different types of food-stuffs.

The device contemplated herein is well adapted for application to a pneumatic vehicle tire as well as numerous other structures. In connection with a tire, the device may be either built-in as a part of the tire valve or may be utilized in the form of a cap mounted on the usual valve stem of a tire. In either instance the device may be set to the required pressure and will thereafter prevent over-pressure of air at the time the tire is inflated.

The present device is both novel and simple in construction; it is dependable and effective in performing the functions intended for it; it is made of sturdy parts in order that it will withstand severe usage; it is capable of being adjusted by persons unskilled in mechanical devices; and it is economical to manufacture so that it may be sold to the user for a reasonable retail price. Numerous other advantages will be apparent to persons skilled in the art after the invention is understood from the following description.

It is preferred to practice this invention and thereby accomplish the divers objects thereof in substantially the manner hereinafter fully described and as more particularly pointed out in the appended claims, and for a graphic understanding thereof reference is made to the accompanying drawings that form a part of this specification.

In the drawings:

Figure 1 is a side elevation of the upper portion of a pressure cooker with the present improvement installed thereon.

Figure 2 is a longitudinal axial section of the adjustable pressure control device removed from the vessel, and showing the relative positions of the parts when the discharge orifice is closed.

Figure 3 is a view partly in section, showing the relative positions of the parts when one of the discharge orifices has been moved to its opened position.

Figure 4 is a transverse section on line 4—4 of Figure 2.

Figure 5 is a fragmentary transverse section on line 5—5 of Figure 2.

Figure 6 is a longitudinal section showing the device applied to a vehicle tire stem.

Figures 7 and 8 are schematic views in section showing relative positions of the parts under different conditions.

Figure 9 is a view of the top of Fig. 6.

Figure 10 is a transverse section on line 10—10 Figure 6.

Figure 11 is a side elevation of a modified device for a vehicle tire stem.

Figures 12 and 13 are longitudinal sections showing a modified tire valve structure with parts in different relative positions.

The drawings are to be understood as being more or less schematic for the purpose of disclosing a typical or preferred form in which the invention may be made, and in said drawings like reference characters are used to identify like parts wherever such parts appear in the different views.

The structure comprises a hollow cylindrical body 5 the lower end portion 6 of which is cupped or inverted dome-shaped and is provided with a threaded stub 7 of a reduced diameter and slightly tapered. This threaded stub 7 projects axially from the dome-shaped end and screws into a threaded aperture in the cover or lid 8 of the pressure cooking vessel 9. Said cover or lid is provided with a pressure gauge 10 and its edge has an annular or marginal rim as well as instrumentalities for sealing and locking the cover to the vessel in an air-tight manner.

The stub 7 has an axial bore 11 to receive the lower end of a pipe 12 that is anchored therein in any suitable manner and extends up axially into the body 5 to near the top of the latter as shown in Figure 2. When the body is mounted in the cover or lid 8 the pipe 12 communicates with the interior of the cooking vessel and pressure in the latter is transmitted through the tube into the interior of the hollow body 5. This construction also prevents condensation accumulating within the body at the discharge end of the pipe where it would affect the operation of the device.

The upper end of the cylindrical body 5 is screw-threaded upon its exterior to receive a flanged gland-nut 13 that is screwed thereon, which nut has a central opening 14 in its transverse end portion. The gland-nut 13 is not screwed to contact the upper end of the cylindrical body 5, and there is a suitable packing gasket 15, of annular shape, seated in the interior against the laterally flanged end portion of the nut. An annular metal washer or ring 16 is interposed between the gasket and the adjacent end of the cylindrical body 5 so that when the nut is screwed down on the cylindrical body, the gasket will be compressed in the manner of the packing in a gland nut.

The adjustable control elements consist of inner and outer telescoped tubes 17 and 18 that slidingly fit each other, but permit rotative movement of the inner tube 17 with respect to the outer tube 18. The outer tube 18 slidingly fits into the opening 14 in the flange of the gland-nut, and extends through the gasket and annular washer down into the cylindrical body 5 to near the bottom thereof, and at its upper end this outer tube 18 is provided with a lateral annular lip 19 that normally rests upon the top face of the gland-nut. The bore of the outer tube 18 is reduced a short distance inside its outer upper end to provide a shoulder or abutment 20 against which the adjacent end of the inner tube 17 rests, and said inner tube is interiorly threaded at this end to receive the threaded shank 21 of an adjustable head 22 that is somewhat conical in shape and is disposed with its base upon the outer surface of the flange 19 at the top of the outer tube. The threaded portion of the shank is of less diameter than the portion thereof that passes through the adjacent end of the tube 18 and said wider portion provides a shoulder that tightly abuts the edge of tube 17 to form a tight joint therewith. Since the outer tube is more or less frictionally held against rotation by the gland-nut packing 15, this arrangement permits the inner tube to be rotated for adjustment independently of the outer tube as will later appear herein. Furthermore, the tubes and head form a piston-like structure that moves through the gland-nut and packing against the tension of the spring 25 whenever pressure is created within the body 5.

The lower end of the outer tube 18 is provided with exterior threads 23 and a stop collar 24 is adjustably screwed thereon to afford a lower seat for a coiled expansion spring 25 that surrounds the telescoped tubes between said collar and the annular metal washer or ring 16. This arrangement causes the telescoped tubes 17 and 18 to be normally urged to the limit of their downward movement with the flange 19 resting upon the top of the gland-nut 13. The inside diameter or bore of the inner tube 17 is less than the outside diameter of the pipe 12 so that an annular passageway 26 is provided between the tubes and said pipe as shown in Figures 2 and 4.

The outer tube 18 has a longitudinally disposed row of holes 27, near its upper end, preferably four in number that are substantially equi-distantly spaced from each other. The inner tube 17 is provided with a helically arranged row of holes 28 (preferably four in number) that may be successively brought into registration and alinement with the holes 27 by rotating the inner tube 17 with respect to the outer tube. The helically arranged holes are spaced apart longitudinally on the tube 17 substantially the same distance that the holes 27 are longitudinally spaced on outer tube 18. The inner tube is also provided with a circumferential row of holes 29, preferably four in number that register successively with the lower hole 27 in the outer tube whenever one of the holes 28 is registered with its proper hole in said outer tube. When the inner tube 17 has been adjusted rotatively to register any one of the holes 28 with its proper hole 27 communication is established between the passageway 26 and the outside of the telescopic tubes beyond tube 18. The device in Figure 2 is shown with the topmost holes of the rows 27 and 28 in registration. In this position it will be seen the bottom hole of the longitudinal row 27 also registers with one of the holes in the circumferential row 29 of the inner tube. When pressure is created within the receptacle or vessel 9, such pressure enters the body 5 and is exerted against the bottom of the shank 21 of the head 22 and, the movable parts, acting as a piston, will move outwardly as pressure increases until the registering holes pass above the top of the gland-nut, as shown in Figure 3. At this time any surplus pressure above that for which the device has been set, will escape. If, through inadvertance, the person using the cooker allows the pressure to accumulate too rapidly as in the case when steam is generated within the vessel, such over-pressure will cause the tubes to continue to rise to the point where the lowermost hole 27, registered with one of the safety holes 29, will be brought into position to be exposed above the gland-nut. This will permit a greater quantity of the pressure or steam to escape and lower the pressure to whatever is desired.

By rotating the head 22 the inner tube 17 is turned until the holes at different locations along the length of the tubes may be brought into registration, depending upon the degree of pressure it is desired to maintain within the vessel upon the particular commodity or foodstuff being prepared. At all times not only the holes to which the device has been adjusted will be in registration, but also the bottom hole of the longitudinal row 27 will be registered with one of the holes in the circumferential row 29 thereby insuring safety at all times. Thus over-pressure, beyond that desired for the operation of the device, is avoided.

The head is provided with a suitable scale showing different pressures to which the tubes may be adjusted for the preparation of different kinds of foodstuff. Also, the tension on the spring 25 may be adjusted for calibrating the device by removing the gland-nut and the tubes from the cylindrical body 5 and then screwing the abutment washer 24 up or down upon the outer tube to tighten or loosen the tension of the spring 25.

The structure illustrated in Figs. 6 to 13 inclusive disclose the application of the device to the inflation stem of a pneumatic tire for vehicles, the type detailed in Figs. 6 to 10 being what may be termed a "built-in" construction, and the type shown in Figs. 11 to 13 being in the form of a removable cap that is substituted for the usual closure cap with which standard tire stems are equipped.

In Fig. 6 the standard valve "insides" are removed from the stem 30 as is also the usual cap and the upper portion of the stem is transversely bored to provide one or more lateral outlet ports 31. The control devices are carried by an inverted cup-shaped member 32 that is internally threaded so that it may be screwed on the end of the stem 30. Radial openings 33 are made in the transverse or top wall of the cup member 32 which openings may be opened or closed by a rotatable damper-like disk 34 superposed upon the outer surface of said member and having openings that may be registered with the openings 33 whenever it is desired to open the top of the cup member for supplying air to the stem and tire. A piston 35 is inserted into the bore of the stem and is formed so that it has what is sometimes called a "suction fit" which adapts it for slight longitudinal movement in the bore when proper pressure is exerted upon it to move it to points above and below the transverse plane of the port 31. Superposed upon and movable with the piston is a metal guide disk 37 that has one or more sectors removed to provide longitudinal recesses or channels 38. A headed rod 39 extends through the transverse wall of the cup and projects down into the bore of the stem where its lower threaded end is screwed into the disk 37 and the piston 35 to support these parts. Thus it will be seen the whole body of the piston is a sectional construction made up of two parts. For the purpose of urging the piston body downward a coiled expansion spring 40 surrounds the rod between the transverse wall of the cup member and the upper face of the piston body. Pressure within the tire urges the piston upward so that its unbroken side portion extends past and closes the discharge port 31. To inflate the tire, the damper-like disk 34 is rotated to uncover the openings 33 and the nozzle of the air-hose then placed on top of the cup-shaped member to allow the air to enter the stem. The pressure of the in-coming air moves the piston body down to a point where the sector channels 38 will allow the air to by-pass the piston body (as indicated in Fig. 8) and pass into lower part of the stem and thence into the tire the greater volume of air passing into the tire and a small quantity escaping through the port 31, but if desired the rod 39 may be rotated to position a disc segment 37 to close the port 31 during inflation of the tire. When the nozzle of the air-hose is removed the piston will return to its normal position to close outlet port 31 unless the internal pressure of the tire is greater than the expansive tension of the spring 40. In the latter event the internal air pressure against the inner face of the piston body will force the latter upward past the outlet port 31 thus allowing the surplus air to escape (as shown in Fig. 7) whereupon the piston body will return to its normal position to close the outlet port 31.

The type of control shown in Figs. 11, 12 and 13 is adapted for use in place of the usual stem cap and without removing the standard valve inside mechanism from the stem. The valve inside mechanism, which is partially shown in detail in Fig. 12, includes a guide element or spindle 41 that has its upper or outer end terminating adjacent the outer end of the stem 30 where it is in convenient reach for manipulation whenever it is desired to deflate the tire. In its application to the stem the invention embodies a cylinder or tube 42, the upper portion of the bore of which is smooth and the lower portion of said bore has threads whereby the structure may be screwed upon the external threads of the stem 30. An outlet port 31ᵃ is made transversely in the wall of the tube beyond the ends of the threads, and there are external threads on the upper end portion of the tube to receive an internally threaded closure cap 43. A piston in the form of a lower valve disc 44 and a guide disc 45 that are separated by an intermediate spacer disk 46 fits the smooth portion of the bore of the stem above the internal threads, and this piston structure is mounted upon the lower portion of a headed rod 39ᵃ. The upper end of the rod is threaded and passes through a threaded opening 47 made centrally in the transverse wall of the cap 43 so that said rod may be adjusted up and down in its opening. At its other or lower end the rod abuts the adjacent protruding end of the valve spindle 41 and a transverse stop 48 retains the piston on the rod. In order to urge the piston downward in a position to close the outlet port 31ᵃ a coiled expansion spring 40ᵃ surrounds the rod 39ᵃ between the top of the piston and the transverse wall of the cap 43. When the cap 43 has been screwed to an adjusted position on the tube or sleeve 42 the structure is screwed on the stem in the manner of the usual stem cap and will depress the valve stem spindle 41. Under normal conditions, as when the tire has been inflated to the required pressure (which corresponds with the pressure to which the cap 43 has been set on its sleeve), there will be no release of air because the tire pressure will equal the adjusted tension of the spring; but, in the event the tire has been over-inflated, the air pressure will overcome the tension of the spring and force the piston upward in the sleeve past the outlet port 31ᵃ where it will remain while the surplus air is discharged through the outlet port. When the tire pressure reaches the tension of the spring the piston will return to normal position opposite the outlet port and close the latter. Adjustment of the tension of the spring 40ᵃ may readily be made by screwing the rod 39ᵃ up or down in its threaded opening to respectively reduce or increase the distance between the piston and the transverse wall of the cap.

What is claimed is:

1. A device of the kind described comprising a hollow body having an opening, a bearing in said opening, a hollow member having a closure at its outer end and adapted for longitudinal movement in said bearing, said member embodying inner and outer telescoped tubes, said inner tube being secured to said closure and normally rotatable with respect to the outer tube, stops at opposite end portions of the outer tube, an expansion spring surrounding said hollow member between the inner stop and said bearing for yieldably maintaining said member at the inward limit of its movement, said outer tube provided with a plurality of ports disposed longitudinally thereof in the direction of its axis and the inner tube provided with a plurality of ports, certain of which ports are disposed helically and certain other of said ports are disposed circumferentially in a common plane, the inner tube adapted for rotative movement with respect to said outer tube whereby a selected helically disposed port is registered with one of the ports in said outer tube and a circumferentially disposed port is registered with another of the ports in said outer tube, and means for supplying pressure fluid to said hollow body whereby said tubular member is bodily moved in its bearing by such pressure to position the selected helical and longitudinal registered ports outside said body to thereby relieve said body of a portion of the pressure fluid.

2. A device of the kind described comprising a hollow body having an opening, a bearing in said opening, a reciprocable hollow member having a closure at its outer end and adapted for longitudinal movement in said bearing, said member embodying inner and outer telescoped tubes, said inner tube provided with annular ports, certain of which ports are disposed helically and certain other of said ports are disposed circumferentially in a common plane, said outer tube provided with ports disposed longitudinally thereof in the direction of its axis, the inner tube adapted for rotative movement with respect to said outer tube whereby a selected helically disposed port is registered with a port in said outer tube and a circumferentially disposed port is registered with another port in said outer tube, and means for establishing communication between the interior of said body and a source of fluid pressure.

3. A device of the kind described embodying a hollow body having an opening; a reciprocable member movable in said opening and comprising telescoped tubes; one of said tubes provided with a plurality of ports certain of said ports disposed helically and certain other of said ports disposed circumferentially in a common plane; the other tube provided with a plurality of ports disposed longitudinally thereof; one of said tubes adapted for rotative movement relative to the other tube whereby a selected helically disposed port is registered with a port in the other tube and also a circumferentially disposed port is registered with another port in said other tube; an end member secured to one of said tubes and closing the outer end of said reciprocable member; and means establishing communication between the interior of said body and source of pressure.

4. A device of the kind described embodying a hollow body having an opening; a reciprocable member movable in said opening and comprising inner and outer telescoped tubes; said inner tube provided with a plurality of ports certain of said ports disposed helically and certain other ports disposed circumferentially in a common plane; said outer tube provided with a plurality of ports disposed longitudinally thereof; one of said tubes adapted for rotative movement relative to the outer tube whereby a selected helically disposed port is registered with a port in said outer tube and also a circumferentially disposed port is registered with another port in said outer tube; an indicator end member secured to said rotatable tube and manually accessible from the exterior of said hollow body for moving said tube, said end member adapted for closing the outer end of said reciprocable member; and means establishing communication between the interior of said body and a source of pressure.

JULIUS J. TREFZ.
OTTO KASPAR.